United States Patent [19]
Hussain et al.

[11] Patent Number: 5,476,013
[45] Date of Patent: *Dec. 19, 1995

[54] MASS FLOW METER

[75] Inventors: Yousif A. Hussain, Coulsdon; Chris N. Rolph, Redhill, both of Great Britain

[73] Assignee: Krohne AG, Switzerland

[*] Notice: The term of this patent shall not extend beyond the expiration date of Pat. No. 5,365,794.

[21] Appl. No.: 260,034

[22] Filed: Jun. 15, 1994

Related U.S. Application Data

[63] Continuation of Ser. No. 917,577, Jul. 21, 1992, Pat. No. 5,365,794.

[30] Foreign Application Priority Data

Jul. 22, 1991 [DE] Germany ............... 41 24 295.5

[51] Int. Cl.⁶ .................................................. G01F 1/84
[52] U.S. Cl. ............................................... 73/861.37
[58] Field of Search ...................... 73/861.37, 861.38, 73/861.02, 32 A

[56] References Cited

U.S. PATENT DOCUMENTS

| | | | |
|---|---|---|---|
| 4,653,332 | 3/1987 | Simonsen | 73/861.38 |
| 4,738,143 | 4/1988 | Cage et al. | 73/861.38 |
| 4,768,384 | 9/1988 | Flecken et al. | 73/861.38 |
| 4,793,191 | 12/1988 | Flecken et al. | 73/861.38 |
| 4,823,614 | 4/1989 | Dahlin | 73/861.38 |
| 4,962,671 | 10/1990 | Stansfeld et al. | 73/861.37 |
| 5,157,975 | 10/1992 | Tanaka et al. | 73/861.38 |

FOREIGN PATENT DOCUMENTS

| | | |
|---|---|---|
| 0473919 | 7/1991 | European Pat. Off. . |
| 3632800 | 4/1988 | Germany . |
| 3824351 | 7/1988 | Germany . |
| 9012610 | 9/1990 | Germany . |
| 4124295 | 7/1991 | Germany . |

*Primary Examiner*—Richard Chilcot
*Assistant Examiner*—Harshad Patel
*Attorney, Agent, or Firm*—Cesari and McKenna

[57] ABSTRACT

A mass flow meter for flowing media that works on the Coriolis Principle has at least one essentially straight Coriolis pipeline carrying the flowing medium, with at least one oscillator acting on the Coriolis pipeline and with at least one transducer detecting Coriolis forces and/or Coriolis oscillations based on Coriolis forces. Measuring errors or mechanical damage due to temperature fluctuations and outside forces and torques are minimized or eliminated by providing a compensation cylinder, and arranging the Coriolis pipeline inside the compensation cylinder.

19 Claims, 5 Drawing Sheets

MASS FLOW METER

RELATED APPLICATION

This application is a continuation of Ser. No. 07/917,577, filed Jul. 21, 1992, now U.S. Pat. No. 5,365,794.

FIELD OF THE INVENTION

The invention concerns a mass flow meter for flowing media, which works on the Coriolis Principle, with at least one basically straight Coriolis line carrying the flowing medium, with at least one oscillator acting on the Coriolis line and with at least one transducer detecting Coriolis forces and/or Coriolis oscillations based on Coriolis forces.

BACKGROUND OF THE INVENTION

Mass flow meters for flowing media that work on the Coriolis Principle are known in various embodiments (see, for example, the German Disclosure Documents 26 29 833, 28 22 087, 28 33 037, 29 38 498, 30 07 361, 33 29 544, 34 43 234, 35 03 841, 35 05 166, 35 26 297, 37 07 777, 39 16 285 and 40 16 907, the European Disclosure Documents 0 083 144, 0 109 218, 0 119 638, 0 196 150, 0 210 308, 0 212 782, 0 235 274, 0 239 679, 0 243 468, 0 244 692, 0 271 605, 0 275 367 and 0 282 552, as well as U.S. Pat. Nos. 4,491,009, 4,628,744 and 4,666,421), and are increasingly being used in practice.

In mass flow meters for flowing media that work on the Coriolis Principle, a basic differentiation is made between those whose Coriolis pipeline is designed basically straight, and those whose Coriolis pipeline is designed to be shaped like a loop. A differentiation is also made for the mass flow meter in question between those that have only one Coriolis pipeline, on the one hand, and those that have two Coriolis pipelines, on the other. Those that have two Coriolis pipelines can have them in series or parallel to one another. All forms of embodiment have advantages and disadvantages.

Embodiments of mass flow meters in which the Coriolis pipeline(s) is/(are) designed to be straight are simple with respect to mechanical design, and consequently can be produced at low cost. Their inner surfaces are easy to work on—for example, to polish; they also have low pressure-loss.

A disadvantage of mass flow meters that work on the Coriolis Principle and whose Coriolis pipeline(s) is/(are) designed to be straight, is that both thermally caused expansion and thermally caused stress, plus outside forces and torques, can lead to measuring errors and to mechanical damage—namely, stress cracks.

An objective of the invention is, therefore, to design and develop the mass flow meter described at the beginning, in which the Coriolis pipeline or pipelines is/are designed to be basically straight, so that temperature fluctuations and outside forces and torques do not lead to measuring errors or mechanical damage, or do so to a lesser extent.

The invention accordingly comprises the features of construction, combination of elements, and arrangement of parts which will be exemplified in the construction hereinafter set forth, and the scope of the invention will be indicated in the claims.

SUMMARY OF THE INVENTION

The mass flow meter according to the invention, from which the task just derived and presented is solved, is now characterized first and foremost by the fact that there is a compensation cylinder, with the Coriolis pipeline being arranged inside of this compensation cylinder. Preferably, the Coriolis pipeline and compensation cylinder are connected to one another in a way that excludes relative axial movement—namely, via two connecting rings connected to the ends of the compensation cylinder.

The term "compensation cylinder" refers to a metallic cylinder, preferably surrounding the Coriolis pipeline concentrically, which compensates for temperature fluctuations and outside forces and torques, and largely eliminates effects of such forces and torques. The structural unit consisting of the Coriolis pipeline and the compensation cylinder—because of the compensation cylinder and, if need be, other measures to be described—is virtually "immune" to temperature fluctuations and outside forces and torques.

Individually, there are now a great many ways of designing and developing the mass flow meter according to the invention.

BRIEF DESCRIPTION OF THE DRAWINGS

For a fuller understanding of the nature and objects of the invention reference should be made to the following detailed description, taken in connection with the accompanying drawings, in which.

DETAILED DESCRIPTION OF ILLUSTRATIVE EMBODIMENTS

Figure 1:
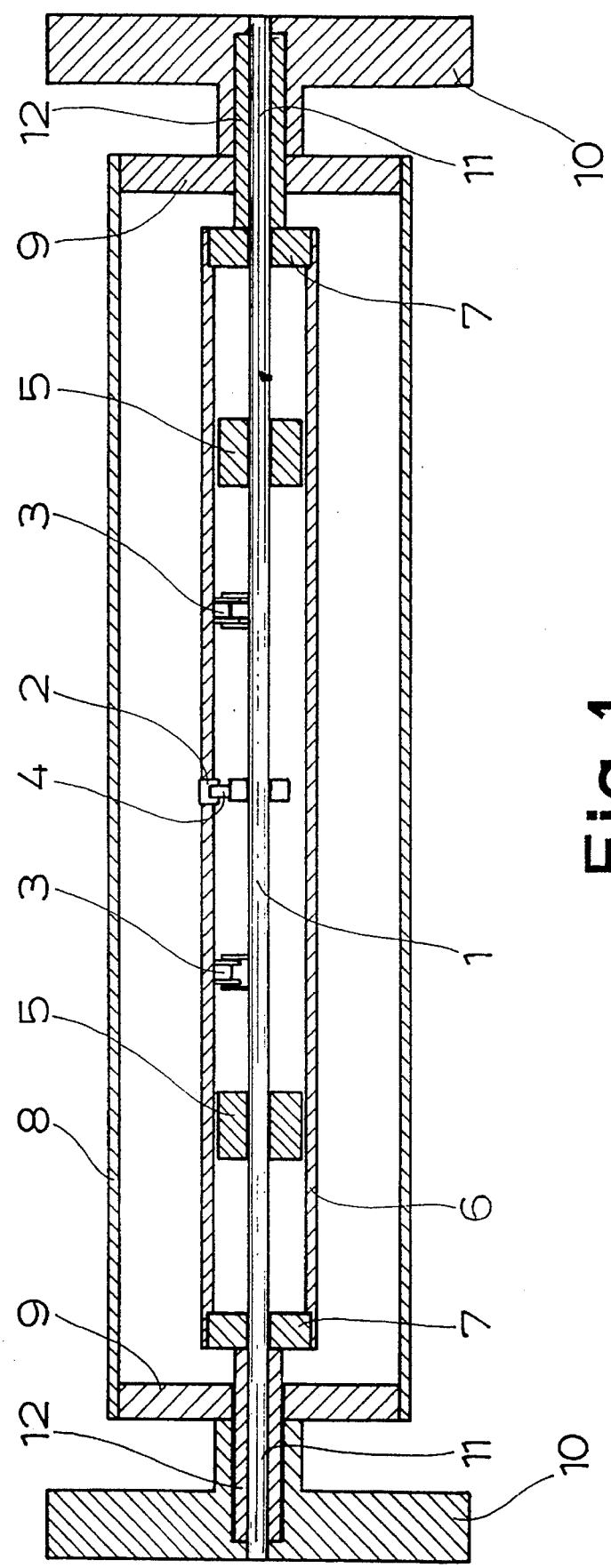
FIG. 1 is a longitudinal section through an initial embodiment of a mass flow meter according to the invention.

The mass flow meter for flowing media according to the invention is one that works on the Coriolis Principle. Consequently, it has a straight Coriolis pipeline 1 carrying the flowing medium as shown in FIGS. 1 to 6, or a basically straight Coriolis pipeline 1 as seen in FIGS. 7 and 8. It also has an oscillator 2 acting on the Coriolis pipeline 1 and 2 transducers 3 for detecting Coriolis forces and/or Coriolis oscillations based on Coriolis forces. In the embodiment shown specifically in FIG. 1, the oscillator 2 works with a pendulum arm 4 provided on the Coriolis pipeline 1 as described in U.S. application Ser. No. 07/736,400, filed Jul. 26, 1991, the contents of which are hereby incorporated by reference herein. In addition, FIG. 1 shows that the Coriolis pipeline 1 also carries units of mass 5, through whose masses and arrangements the natural frequency of the Coriolis pipeline 1 can be influenced within certain limits.

According to the invention, the flow meter also includes a compensation cylinder 6, and the Coriolis pipeline 1 is arranged within the compensation cylinder 6. The Coriolis pipeline 1 and compensation cylinder 6 are connected to one another in a way that excludes relative axial movement, in all embodiments shown, via two connection rings 7 connected to the ends of the compensation cylinder 6. The connecting rings 7 can be connected by welding or hard soldering to compensation cylinder 6; it is also conceivable for the connecting rings to be screwed onto the ends of the compensation cylinder. Preferably, the connecting rings 7 are composed of the same substance as the Coriolis pipeline 1. The Coriolis pipeline 1 is connected by welding or by hard soldering to the connecting rings 7, preferably by vacuum hard soldering e.g., nickel alloy with a soldering temperature of about 1000° C.

As stated above, the Coriolis pipeline I can be made virtually "immune" to temperature fluctuations and to forces and torques from the outside by means of the compensation cylinder 6 and, if necessary, by other measures. The Coriolis pipeline 1 may be arranged under tension within cylinder 6. For this, the pipeline may consist of a nickel alloy and the cylinder 6 may consist of a nickel alloy, or unalloyed steel or ferritic stainless steel.

A supplemental measure for "immunizing" the Coriolis pipeline 1 to temperature fluctuations and to outside forces and torques consists of using materials with the same or almost the same heat expansion coefficients for the Coriolis pipeline I and the compensation cylinder 6, especially materials with relatively low heat-expansion coefficients. From this standpoint, it is suggested that titanium or a titanium alloy or a nickel alloy, especially Hastelloy C4, be used for the Coriolis pipeline 1, and unalloyed steel, e.g., A1S1 1018 ferritic stainless steel or the above nickel alloy for the compensation cylinder 6.

Figure 2:
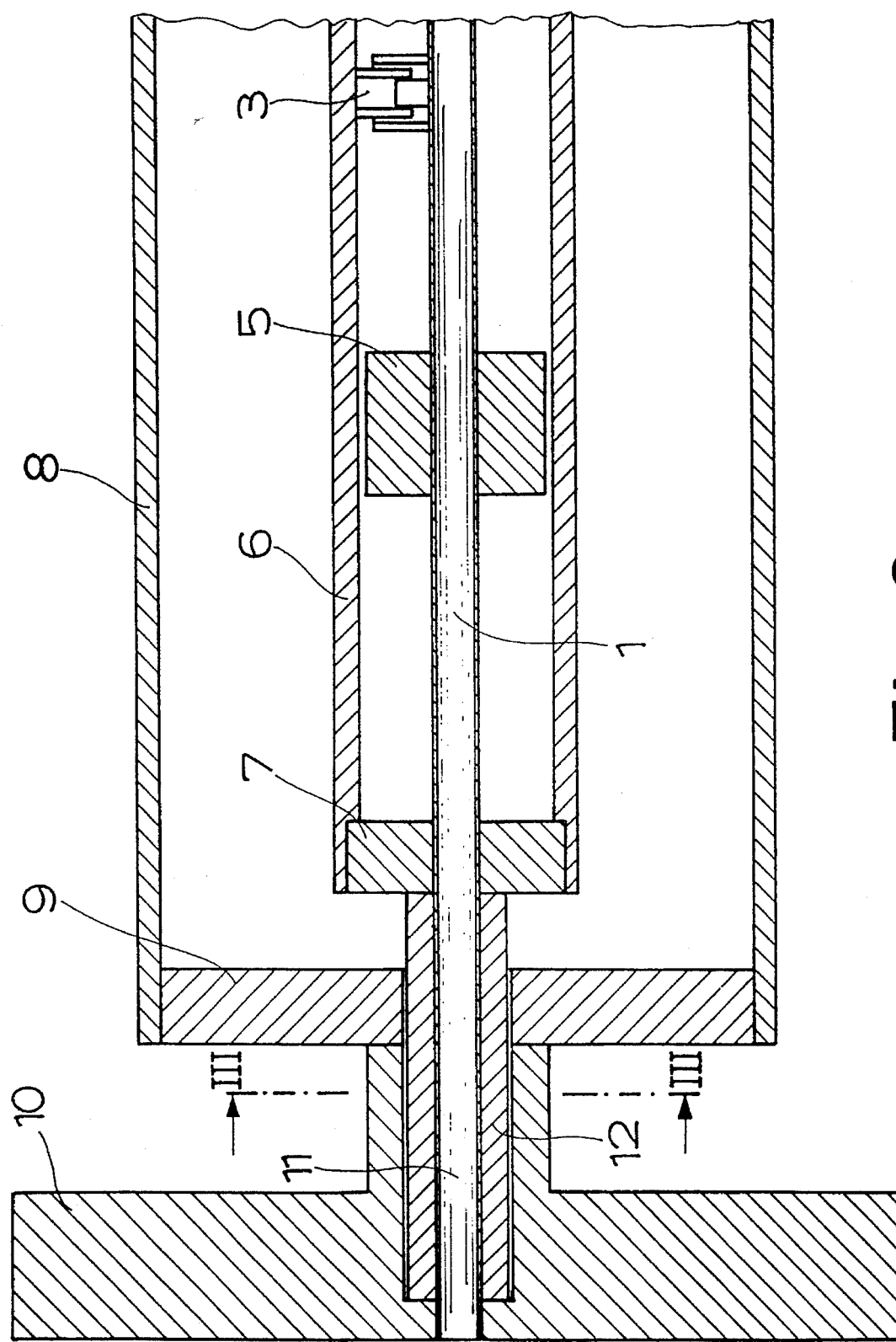
FIG. 2 is a similar view, on a larger scale, of a section of the FIG. 1 flow meter.
Figure 3:
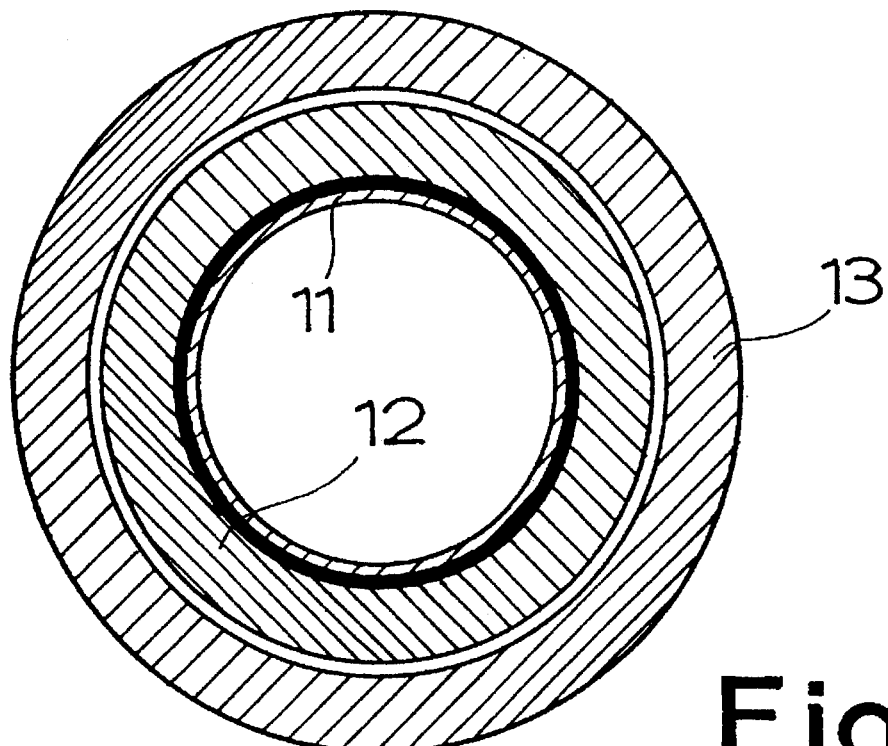
FIG. 3 is a sectional view, on a still larger scale, taken along the line III—III of FIG. 2.

Referring to FIGS. 1 and 2, another supplemental measure for "immunizing" the Coriolis pipeline 1 against temperature fluctuations and outside forces and torques consists of having an outer cylinder 8, preferably made of stainless steel, and arranging the unit consisting of the Coriolis pipeline 1, the compensation cylinder 6 and the connecting rings 7 within the outer cylinder 8. As best seen in FIGS. 2 and 3, this embodiment is preferably also characterized by the fact that the outer cylinder 8 has two connecting rings 9 on its opposite ends, preferably made of stainless steel, a raised connecting flange 10 on the outside of the connecting rings 9 and connecting pipelines 11 connected to the Coriolis pipeline 1 by the connecting rings 9 in the connecting flanges 10. Preferably, the Coriolis pipeline 1 and the connecting pipelines 11 are designed in one piece; that is, preferably a single length of pipeline extends all the way through the flow meter.

It is also recommended that a reinforcing cylinder 12, e.g., of Nylo 36, cover the connecting pipelines 11 to protect them, as shown.

For the reasons given above, it may be desirable to arrange the connecting pipelines 11 under tension within the reinforcing cylinder 12. In this way, the connecting pipelines 11 can be connected to the reinforcing cylinders 12 by hard soldering, preferably by vacuum hard soldering and preferably with a nickel alloy solder at a soldering temperature of around 1000° C. This is shown by the heavy black circle in FIG. 3.

Figure 4:
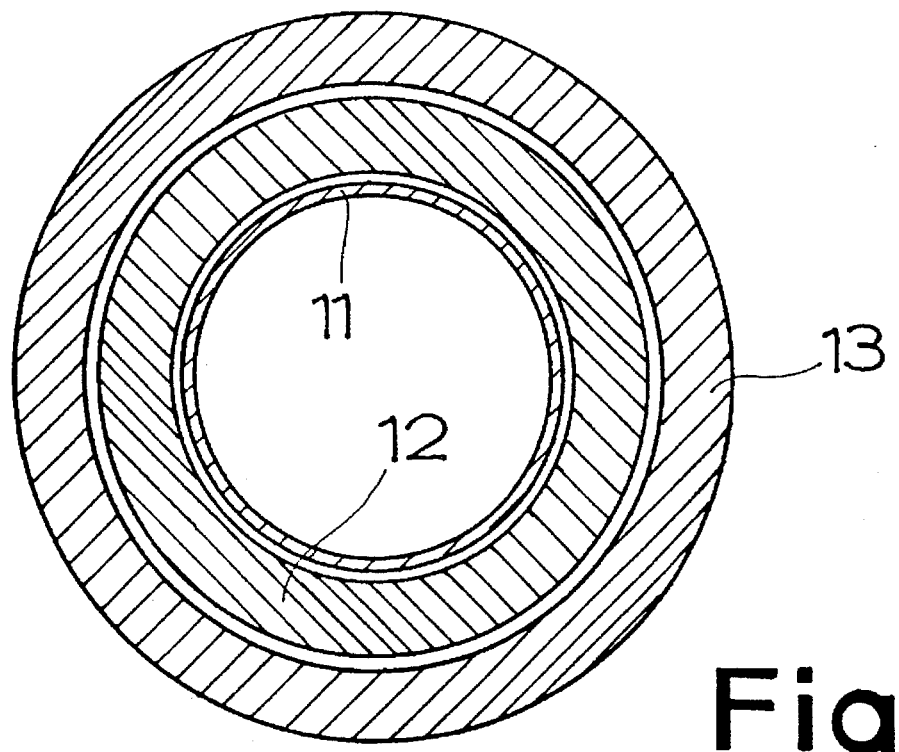
FIG. 4 is a view similar to FIG. 3 showing a second embodiment of a mass flow meter according to the invention.

As described above, one supplemental measure to "immunize" the Coriolis pipeline I against temperature fluctuations and against outside forces and torques can consist of choosing materials with the same or almost the same heat-expansion coefficients for the Coriolis pipeline 1 and the compensation cylinder 6, especially materials with relatively low heat-expansion coefficients. In such an embodiment of our mass flow meter, it is not necessary to connect the connecting pipes 11 to the reinforcing cylinder 12. This is shown in FIG. 4 by the absence of a heavy black circle between pipeline 11 and cylinder 12.

Figure 5:
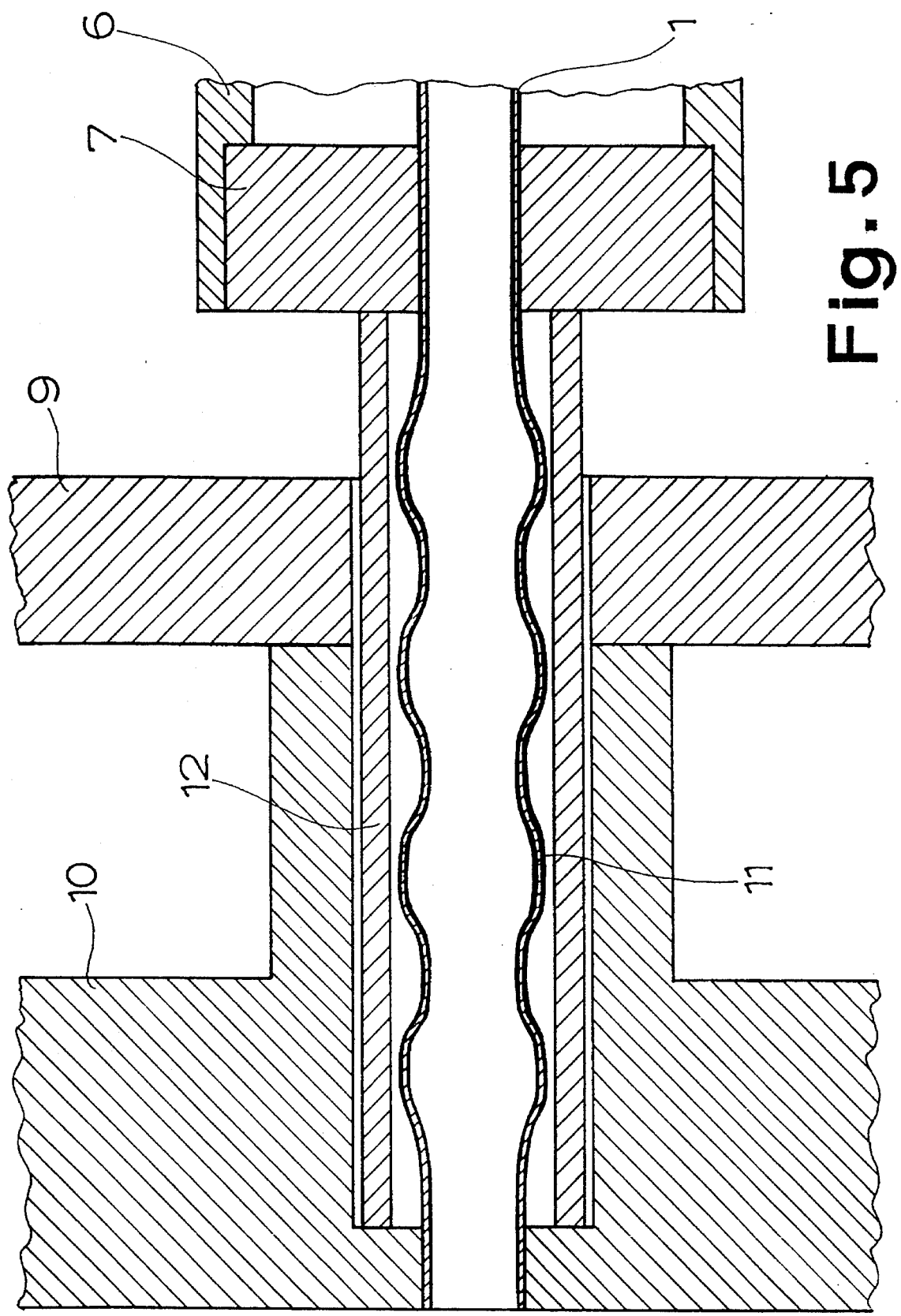
FIG. 5 is a longitudinal section similar to FIG. 2, but on a larger scale, through a section of a third embodiment of a mass flow meter according to the invention.

The primary measure of the invention, namely a structural unit consisting of Coriolis pipeline 1, compensation cylinder 6 and connecting rings 7, as already stated, means that the—Coriolis pipeline 1—essential for measurement—is—more or less—"immune" to temperature fluctuations and outside forces and torques. Immunizing measures concerning the connecting pipelines 11 have already been described. Another measure, shown in FIG. 5, is to design the walls of the connecting pipelines 11 to be curved or wavy. This ensures that the structural unit consisting of the Coriolis pipeline 1, the compensation cylinder 6 and the connecting rings 7 can expand thermally within certain limits without any impermissibly high stresses.

Figure 6:
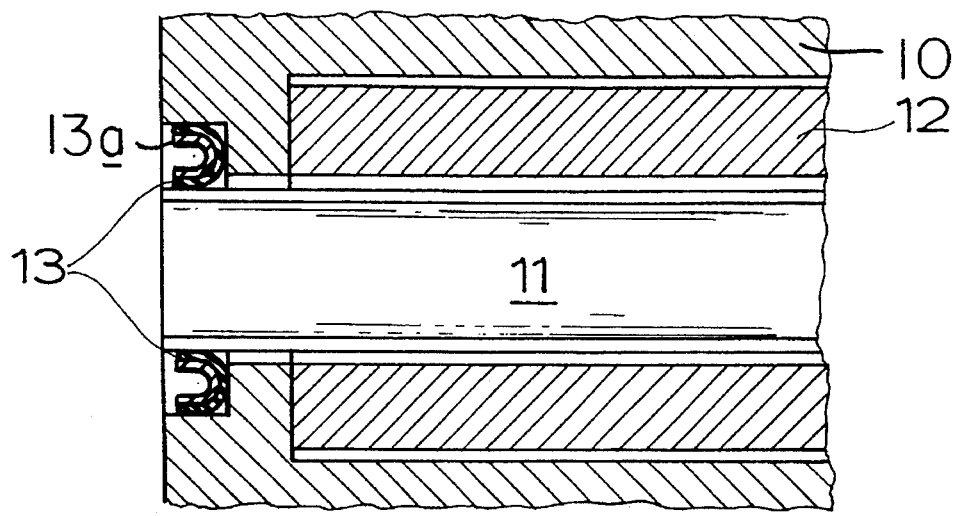
FIG. 6 is a longitudinal section through a section of a fourth embodiment of a mass flow meter according to the invention.
Figure 7:
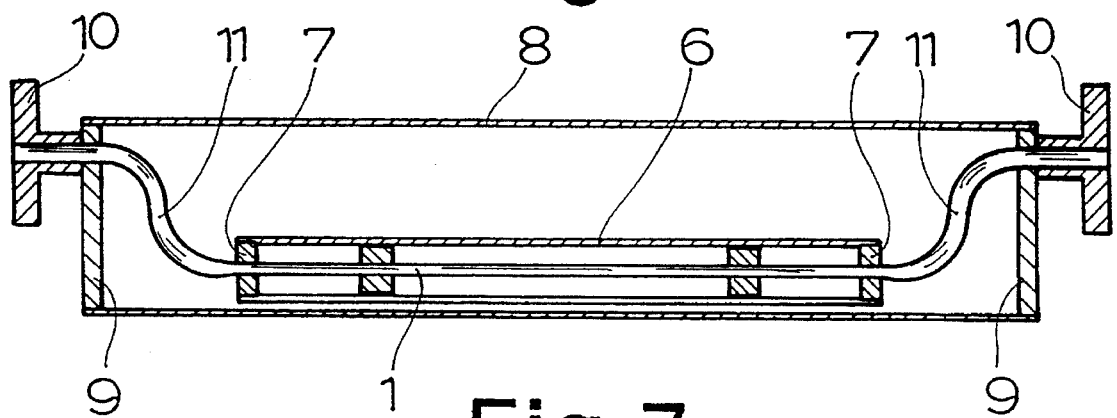
FIG. 7 is a longitudinal section through a fifth embodiment of a mass flow meter according to the invention.
Figure 8:
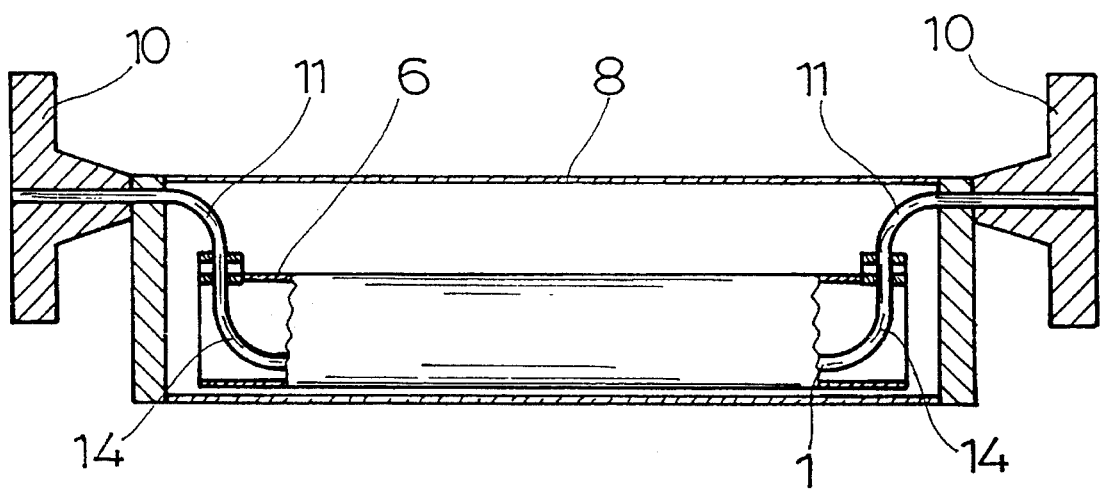
FIG. 8 is a longitudinal section through a sixth embodiment of a mass flow meter according to the invention.

FIGS. 6 to 8 show embodiments of the mass flow meter according to invention, in which impermissibly high stresses due to heat-related expansion of the structural unit—consisting of the Coriolis pipeline 1, compensation cylinder 6 and connecting rings 7—is avoided in ways other than those described in connection with FIG. 5.

In the embodiment only suggested in FIG. 6, the connecting pipelines 11 can move axially within the reinforcing cylinder 12 and the connection flanges 10. Also, gaskets 13 are arranged on the ends of the connecting pipelines 11 away from the Coriolis pipeline 1. While O-rings may be used as the gaskets, for the embodiment shown in FIG. 6, each gasket 13 is designed as a semicircular ring, e.g., of polytetrafluorethylene, and acted on and held in place by a similarly shaped stainless steel spring 13a.

In the flow meter embodiment depicted in FIG. 7, the connecting pipelines 11 are curved, i.e., S-shaped, while in the embodiment shown in FIG. 8, the ends 14 of the Coriolis line I are curved, i.e., shaped like a quarter-circle, and the connecting pipelines 11 are also shaped like a quarter-circle. Also, as shown in FIG. 7, the curved connecting pipelines 11 may have a larger diameter than the Coriolis pipeline I to reduce or eliminate the pressure-drop caused by the curves. The line ends 14 may likewise be enlarged.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

We claim:

1. A mass flow meter for flowing media that works on the Coriolis Principle, with at least one basically straight Coriolis tube having opposite ends and carrying the flowing medium, at least one oscillator acting on the Coriolis tube, at least one transducer detecting Coriolis forces or Coriolis oscillations based on Coriolis forces and a support tube having opposite ends, the Coriolis tube being inside the support tube, and the Coriolis tube and the support tube being connected to one another so as to prevent relative axial movement, the improvement wherein the Coriolis tube (1)

and the support tube (6) are made of materials with substantially the same coefficients of thermal expansion.

2. The mass flow meter according to claim 1 wherein the Coriolis tube (1) and the support tube (6) are of materials with relatively low coefficients of thermal expansion.

3. The mass flow meter according to claim 2 wherein the Coriolis tube (1) is of titanium or a titanium alloy.

4. The mass flow meter according to claim 2 or 3 wherein the support tube (6) is of a material selected from the group consisting of unalloyed steel, ferritic stainless steel or a nickel alloy.

5. The mass flow meter according to claim 1 wherein first connecting rings (7) connect the Coriolis tube and support tube ends to one another so as to prevent relative axial movement, and further including an outer tube (8) preferably of stainless steel and having opposite ends, the structural unit consisting of the Coriolis tube (1), the support tube (6) and said first connecting rings (7) being arranged inside the outer tube (8).

6. The mass flow meter according to claim 5 further including second connecting rings (9) connected to the ends of the outer tube (8), a connecting flange (10) on the outside of each of said second connecting rings (9), means for connecting each connecting flange (10) to the corresponding second connecting ring (9), and connecting tubes (11) having corresponding first ends connected to the opposite ends of the Coriolis tube (1) and corresponding second ends extending through the respective second connecting rings (9) into the respective connecting flanges (10).

7. The mass flow meter according to claim 6 wherein the Coriolis tube (1) and the connecting tubes (11) constitute a single length of tubing.

8. The mass flow meter according to claim 7 further including a reinforcing tube (12) housing each connecting tube (11).

9. The mass flow meter according to claim 8 wherein the connecting tubes (11) are arranged under tension inside the respective reinforcing tubes (12).

10. The mass flow meter according to claim 9 further including soldering the connecting tubes (11) to the respective reinforcing tubes (12), said soldering being vacuum hard nickel alloy soldering with a soldering temperature of about 1000° C.

11. The mass flow meter according to claims 6 wherein said connecting tubes (11) are corrugated.

12. The mass flow meter according to claim 8 wherein the connecting tubes (11) are movable axially within the respective reinforcing tubes (12) and the connecting flanges (10).

13. The mass flow meter according to claim 12 further including sealing means (13) on said second ends of the connecting tubes (11).

14. The mass flow meter according to claim 13 wherein said sealing means (13) are O-rings.

15. The mass flow meter according to claim 13 wherein the sealing means (13) are semicircular in cross section, are composed of polytetrafluorenthylene and are spring loaded.

16. The mass flow meter according to claims 6 wherein the connecting tubes (11) are curved.

17. The mass flow meter according to claim 16 wherein said opposite ends (14) of the Coriolis tube (1) are curved.

18. The mass flow meter according to claim 16 or 17 wherein the curved connecting tubes (11) have a larger diameter than the Coriolis tube.

19. The mass flow meter according to claim 18 wherein said opposite ends (14) of the Coriolis tube (1) have a larger diameter than the remainder of the Coriolis tube (1).

* * * * *